United States Patent [19]

Rattunde

[11] Patent Number: 4,710,154

[45] Date of Patent: Dec. 1, 1987

[54] PLATE LINK CHAIN FOR CONE PULLEY DRIVES

[75] Inventor: Manfred Rattunde, Bad Homburg, Fed. Rep. of Germany

[73] Assignee: Reimers Getriebe AG, Ch-zug, Switzerland

[21] Appl. No.: 877,938

[22] Filed: Jun. 24, 1986

[30] Foreign Application Priority Data

Jul. 20, 1985 [DE] Fed. Rep. of Germany ....... 3526062

[51] Int. Cl.$^4$ ............................................... F16G 1/24
[52] U.S. Cl. .................................. 474/242; 474/245; 474/201
[58] Field of Search ............... 474/242, 201, 244, 245, 474/219-221, 223; 59/31; 228/50, 139; 285/21; 219/121 ED, 121 LD; 198/851

[56] References Cited

U.S. PATENT DOCUMENTS

| 2,279,134 | 4/1942 | Dalrymple | 474/242 X |
| 2,353,595 | 7/1944 | Shields | 474/245 |
| 2,550,431 | 4/1951 | Shaw | 474/242 X |
| 3,407,672 | 10/1968 | Keller | 474/242 |
| 4,428,740 | 1/1984 | Moore | 474/242 |
| 4,437,565 | 3/1984 | Vatja | 198/851 |
| 4,500,305 | 2/1985 | Rattunde | 474/201 |
| 4,504,255 | 3/1985 | Rattunde | 474/201 |
| 4,516,963 | 5/1985 | Mott | 474/245 |
| 4,516,964 | 5/1985 | Laster | 474/245 |
| 4,516,965 | 5/1985 | Mott | 474/245 |

FOREIGN PATENT DOCUMENTS

| 1145871 | 5/1969 | Fed. Rep. of Germany . |
| 1302795 | 11/1970 | Fed. Rep. of Germany . |
| 2356289 | 11/1974 | Fed. Rep. of Germany . |
| 3027834 | 4/1982 | Fed. Rep. of Germany . |
| 3129631 | 8/1983 | Fed. Rep. of Germany . |

*Primary Examiner*—Stephen J. Novosad
*Assistant Examiner*—Thuy M. Bui
*Attorney, Agent, or Firm*—Edwin E. Greigg

[57] ABSTRACT

A plate-link chain for infinitely adjustable cone pulley drives of which the link pivot elements, embodied in particular as thrust pieces which with their end faces transmit the frictional forces between friction disks and the plate link chain, are secured against shifting sideways out of the plate recesses by means of at least one securing element. The securing element is embodied as a metal piece fastened on a contacting part of the profile of the link pivot element opposite the link plate recesses adjacent to the links by a suitable welding process.

13 Claims, 10 Drawing Figures

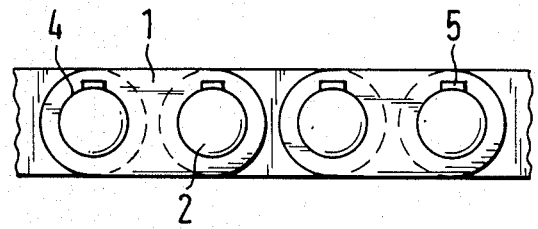
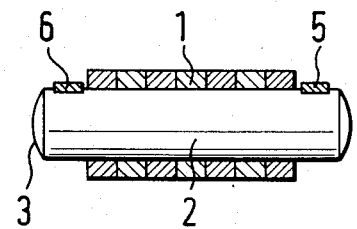
FIG. 1      FIG. 1A
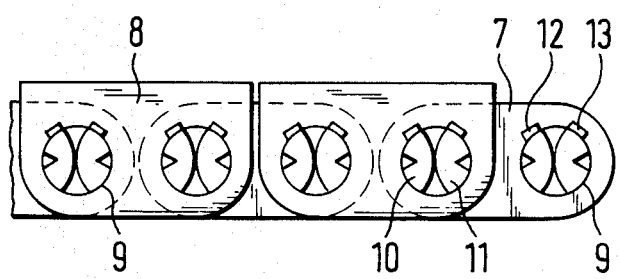
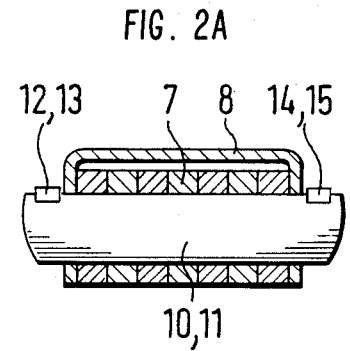
FIG. 2      FIG. 2A

PLATE LINK CHAIN FOR CONE PULLEY DRIVES

BACKGROUND OF THE INVENTION

The invention relates to a plate link chain for infinitely adjustable cone pulley drives, of which the link pivot elements, joining the individual chain links, are embodied in particular as thrust pieces, which with their end faces transmit the frictional forces between the friction disks and the plate link chain and with the link pivot elements inserted into recesses in the plates. Such chains are also known as flat link articulated chains and roller chains. The link pivot elements touch the plate recesses with at least one contacting part of their profile and are secured against escaping sideways out of the plate recesses by at least one securing device.

There are many known forms of link pivot elements for such chains, among them those described in German Pat. Nos. 1 145 871; 1 302 795, 2 356 289; 3 027 834 and U.S. Pat. Nos. 4,500,305; 4,504,255; 4,516,963; 4,516,964; 4,516,965 to name only a few examples. The link pivot elements may be cylindrical link shafts, paired cradle shaft elements, single cradle shaft elements embodying the entire link element, or the like. There is no limitation in this respect in the subject of the present invention.

As for securing the link pivot elements against escaping sideways from the recesses or bores in the plates, the above-mentioned German Pat. Nos. 1 302 795 and 2 356 289 give examples in which, in general terms, bosses or the like are provided on individual plates, or on separately provided securing elements surrounding the link elements; these bosses engage corresponding recesses in the link elements that extend substantially longitudinally of the chain and thereby secure them against lateral movements. Also, U.S. Pat. No. 4,545,779 uses expanded ends of the shaft to prevent movement of the pivot shafts.

This retention of the link elements may be desired or necessary for most various reasons. A primary reason is that the chains are assembled in finished form by the manufacturer and are subsequently moved about, stored, packed and unpacked or otherwise handled while the chain is in an unloaded state prior to finally being used. Since when the chain is assembled the link elements are simply inserted from the side into the plate bores, they can just as easily fall back out of these plate bores while there is no load on the chain, therefore appropriate securing devices are necessary to prevent loss of the link elements.

If the chain is in its installed condition and is under tensile load, then the link elements basically have no tendency to slide sideways out of the plate bores. However, it must not be overlooked that other forces, resulting for instance from vibration, may nevertheless cause the link elements to have a tendency to shift sideways out of the plate bores; given the ensuing realignment when the link elements move in between the cone pulleys, there is a continuous movement back and forth in the plate bores, which causes considerable wear. This situation, as well, is remedied by means of the above-mentioned securing elements.

A similar case arises if the drives are installed with vertically upright axes; then the link elements are likewise disposed substantially vertically, and accordingly, under the influence of gravity, they have a tendency to slide out of the plate bores on one side of the chain.

However, the known securing means or elements as described above are associated with a number of disadvantages, which heretofore were tolerated, because for the reasons given some sort of securing means is indispensable. In particular, the known securing means may hinder automatic chain assembly, or may even make such assembly impossible, because the securing engagement connection between the above-mentioned bosses or the like, on the one hand, and the recesses of the link element, on the other, is attainable only by means of often-complex swiveling movements of the components, or else necessitates assembling the chain while it is in particular curved positions rather than in an extended state. These factors affecting automatic chain assembly become all the more serious given that in the course of modern development the distances between chain links are becoming smaller, and so the number of parts that must be assembled rises accordingly.

Another considerable disadvantage of the known securing means is that the link elements must be provided with recesses for this purpose, as described above, which reduces their cross section; yet this is still another factor of increasing significance in modern chain development, because as chain links become finer and finer, the component parts are becoming smaller and smaller as well. Furthermore, such provisions sometimes result in chain structures that do not allow such securing means at all; one example is German Pat. No. 3 027 834 mentioned above. In such chains, securing means must accordingly be dispensed with entirely, and the danger of sideways shifting of the link pivot elements must somehow be taken into account.

OBJECT AND SUMMARY OF THE INVENTION

In a plate link chain of the above generic type, it is therefore the object of the invention to provide a novel embodiment of the securing means such that the securing means can always be used, in the same way, regardless of the particular form of chain involved, and on the other hand such that automatic chain assembly is no longer affected thereby or forced into certain modes, so that the securing means is no longer any hindrance to automatic chain assembly, and hence to economical chain manufacture. Furthermore, the securing means should no longer present any limitation whatever on how the link elements are embodied, whether because of a possible cross-sectional reduction or because of some change in cross section and the associated machining involved. Finally, the securing means itself should be simply and easily manufactured, with little effort, which includes machining time, and should therefore be much more favorable in cost.

According to the invention, this object is attained by providing that the securing element is a metal piece secured to the contacting part next to the plate means by energy-beam welding.

By means of this extremely simple provision according to the invention, link pivot elements of any kind can be secured against shifting sideways out of the plate unit of the chain without occupying additional space. This overcomes a former prejudice, accordingly to which procedures associated with severe heating could no longer be performed on the finished link elements, because these highly-stressed components are hardened so that they can meet the demands placed upon them. This hardening, and the structure accordingly attained, are known to be altered or destroyed by heating, however, which would result in material strains, lowered wear resistance, distortion of the component from its original, highly accurately produced form, and a general reduction in the load the elements could support. By applying small metal pieces or wafers, for which even the smallest dimensions are sufficient, by energy-beam welding according to the invention, however, the overall result is a securing means for which the energy required to apply it can be accurately metered, locally quite narrowly defined, and supplied within a very brief time, so that heating of the link element beyond the welding zone does not occur. Furthermore, the merely spot-like welding zone cools back down again immediately because of the thermal conductivity of the link element, and experience has shown that a re-hardening of the material occurs at the critical location, so that in the final analysis virtually the same condition as that prevailing before the welding is once again attained, or is maintained unchanged.

Furthermore, the securing means according to the invention avoids any machining of the ink pivot element at all, and in particular dispenses with any reduction in its cross section by the provision of recesses or the like, so that as compared with known cases, the link pivot element can be automatically assembled in the simplest possible manner, practically in its "unfinished state" existing before the steps required for securing it are taken, even with the chain in the extended position.

For many applications it may suffice for the metal piece to be disposed on one end of the link element, outside the plate packet. Generaly, however, it is useful for a metal piece to be mounted on both ends of the link element, outside the plate packet. Then to close the chain when it is assembled, one of the link pieces may be provided with only a single metal piece and hence embodied as a closing link. The space for this embodiment of the securing means according to the invention is available in any event already, because the end faces of the link elements, being adapted to the inclination of the friction disks, are likewise inclined crosswise to the longitudinal direction of the chain.

The above-described embodiment is suitable for chains with either so-called two-plate members or three-plate members. The two-plate structure means that two plates each, extending crosswise to the longitudinal direction of the chain and adjacent to externally located struts, are located side by side between two adjacent link elements; depending on the spacing of these link elements, the result is a relatively narrow chain, crosswise to the direction of chain travel. Contrarily, with chains having three-plate members, the plates located beside one another as viewed in the width of the chain are offset from one another by one space; although this makes the chain wider by one-half crosswise to the chain travel direction, on the other hand the distance between adjacent link elements is shorter.

In particular for three-plate-member chains, it may be useful according to the invention for the metal piece to be disposed inside the plate packet between two plates spaced apart from one another crosswise to the direction of chain travel. Thus securing of the link elements in both displacement directions is again attained, without requiring additional space. This structure of naturally just as well suited to for chains of the two-plate member type, however, as long as there are spaces remaining in the chain structure, which is not always the case.

For the structures described, it may be useful depending on the individual case for at least two metal pieces to be attached to the link elements in a given cross-sectional plane, the pieces being distributed over the circumference of the link elements. This makes it possible to reduce the size of the individual metal piece, for instance, and thus less retaining force needs to be exerted.

In terms of producing the securing means according to the invention, the metal pieces are advantageously attached by means of laser welding, because this has proved to be particularly favorable in terms of controlling the welding operation.

In producing the securing means according to the invention, it is furthermore possible to proceed such that the material of the metal pieces is delivered in the form of a band to the end of the link element crosswise to the longitudinal direction of the chain, and the metal piece is separated from the band once it has been fastened to the end of the link element. Thus once the link elements have been inserted the chain can continue to travel in a straight line in automatic assembly machines, without further difficulty, and pass through a welding station, in which the metal band enters from one or both sides and then the metal pieces can be cut off after being spot-welded to the link elements.

If a chain in which the link elements are embodied as pairs of cradle elements is being assembled, then it is also possible to place open metel-band rings onto the ends of the pairs of cradle elements, with the openings of the rings pointing crosswise to the longitudinal direction of the chain, then to join the rings to the cradle elements at contacting parts of the cradle elements, and finally to cut through the rings, at the point opposite the opening, thereby removing a portion of the circumference of the rings. As a result, despite a narrowly limited heating of the cradle elements, a relatively large securing means is attained, which is fixed at a plurality of points, yet without hindering the mutual swiveling of the cradle elements during chain travel.

Finally, the material making up the metal pieces can also be supplied to the link element end, with the chain in a curved condition, from the outside of the curvature inward in the form of a band which is bent in the same direction of curvature; then the metal piece can be separated from the band after the fastening of the link elements. In this case, because of how the metal band is guided, the metal piece that is to be spot-welded and then separated already has a curvature that is adapted to the outside of the link elements, thereby making a good bond between the link element and the metal element possible.

With respect to the link element, the above discussion refers to a "contacting part", to which the metal pieces are attached; in the context of the invention, this term is intended to define that part of the outer contour of the link elements which has no freedom with respect to the recesses or bores of the shackles, because only if the attachment is effected there, can the associated metal piece perform its securing function properly.

The invention will be better understood and further objects and advantages thereof will become more apparent from the ensuing detailed description of preferred embodiments, taken in conjunction with the drawings.

BRIEF DESCRIPTION OF THE DRAWINGS

FIG. 1 shows a side view of a portion of a chain having cylindrical link elements;

FIG. 1a shows a sectional view of FIG. 1;

FIG. 2 shows a side view of a portion of a chain having link elements in the form of pairs of cradle elements;

FIG. 2a shows a sectional view of FIG. 2;

DESCRIPTION OF THE PREFERRED EMBODIMENTS

Figure 3:
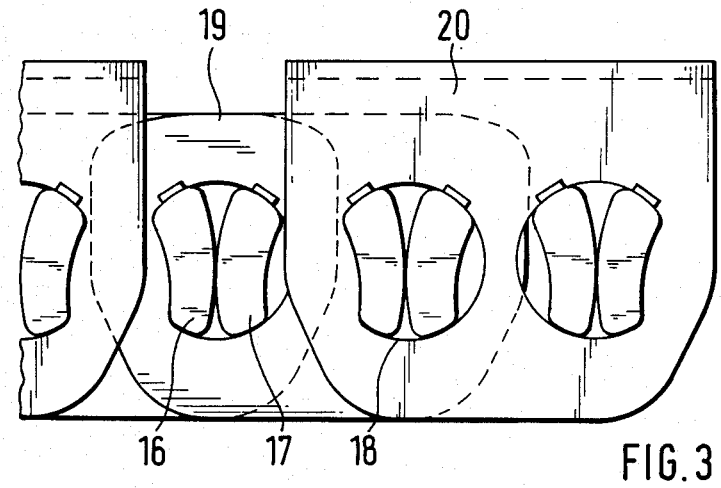
FIG. 3 is a side view of a chain similar to FIG. 2 but with modified cradle elements; p

FIG. 1 shows a side view, and FIG 1a shows a sectional view, of a chain intended for cone pulley drives, the chain members of which are made up of plates or links 1 and the link pivot members of which are embodied as cylindrical shafts 2. The shafts 2 have end faces 3, with which they are in friction-transmitting contact with the friction disks, not shown, of the cone pulley drive.

To prevent the shafts 2 from being able to slide or fall out of the bores or recesses 4 of the plates 1, small metal wafers 5, 6 are applied by laser welding to their protruding ends, which enlarges the shaft cross section at the metal wafer as compared with the cross section of the plate bores or recesses 4.

FIG. 2 shows a fragmentary side view, and FIG. 2a shows a sectional view, of a plate link chain with plate links 7 and side plates 8 embodied as so-called bracket plates. Somewhat kidney shaped link pivot elements embodied as pairs of cradle pivot elements 10, 11 are inserted in the bores of the plates 7 and 8. Small metal pieces 12, 13, 14 and 15 are welded onto the protruding ends of the cradle pivot elements 10, 11, thereby radially enlarging the cross section of the cradle elements 10, 11 at the small metal pieces so that they are in contact with the outside bracket plates.

Figure 4:
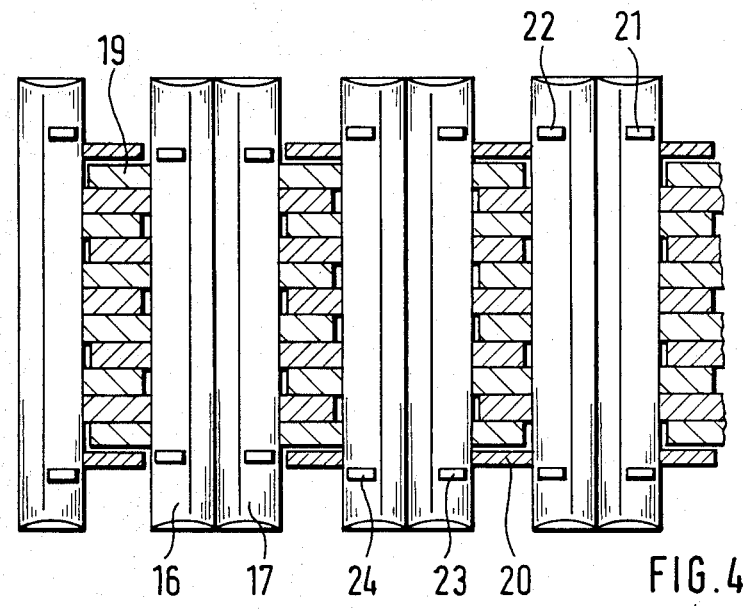
FIG. 4 is a plan view of the chain of FIG. 3.

FIGS. 3 and 4 illustrate, in a side view and plan view respectively, a chain similar to FIG. 2, in which only the cradle pivot elements 16, 17 and accordingly the plate bores or recesses 18 of the plates 19, 20 have a modified embodiment. As shown particularly in FIG. 4, the metal pieces 21, 22, 23 and 24 are each mounted directly beside the adjoining plates 19 or 20, outside the plate packet.

Figure 5:
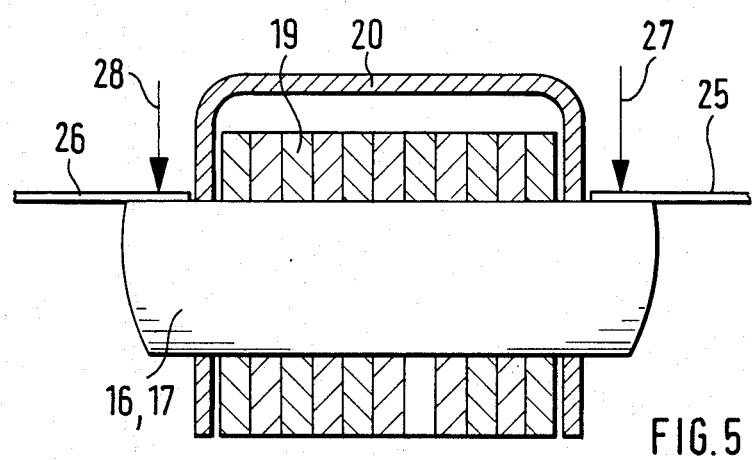
FIGS. 5-7 show various possible ways of attaching the link element securing means.

FIG. 5 shows a sectional view of a chain for instance like that of FIGS. 3 and 4; the same reference numerals are therefore used for like parts. This figure also shows how the material for the metal pieces 21-24 of FIG. 4 is supplied from the side, in the form of strips 25, 26, to the ready-assembled chain. The arrows 27, 28 indicate the laser welding apparatus, with which the front ends of the strips 25, 26 are welded onto the cradle pivot elements 16, 17. Following this operation, this front end that extends beyond the end of the shaft is then cut off by a cutting device, not shown, so that the chain can be indexed with respect to the bands 25, 26 of the next adjacent cradle pivot element 16 or 17 for securing the strips thereto.

FIG. 6 again shows the chain according to FIG. 3. Here, rings 30 having an opening 29 are mounted over the ends of pairs of cradle pivot elements 16, 17 crosswise to the longitudinal direction of the chain and fastened by means of the welding devices indicated by the arrows 31, 32; a corresponding fastening could also be effected on the underside of the cradle elements 16, 17. Here, however, following the welding operation separating cuts 33-36 are made, so that the parts of the rings that have not been welded onto the cradle pivot elements drop off. This does mean a certain expenditure of material, but in the present case it is justified by the fact that the material for the metal pieces is held correctly in position for the welding operation, and furthermore is pre-curved in accordance with the outer contour of the cradle pivot elements 16, 17, so that upon welding, a good bond between the cradle elements and the metal pieces is attained.

Figure 6:
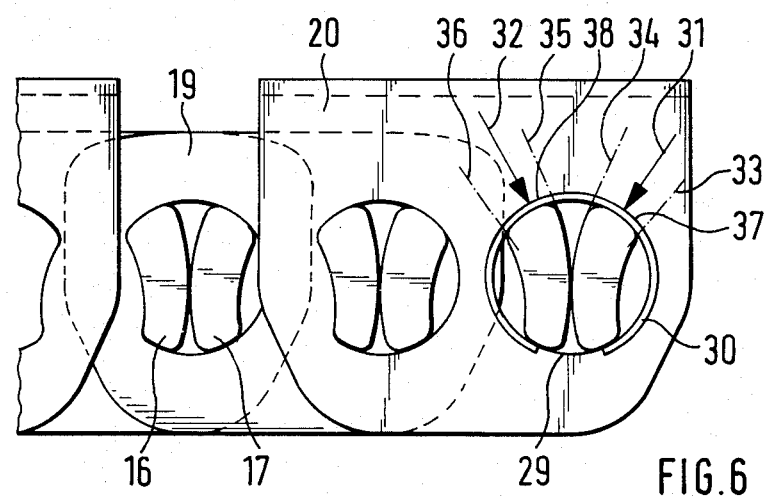
Figure 7:
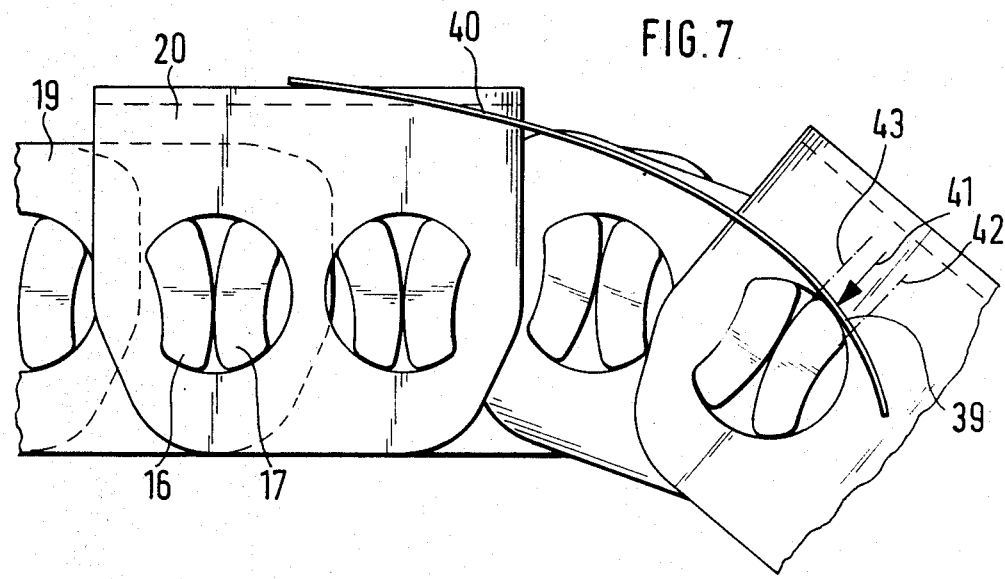

FIG. 7 shows a manufacturing process effected on a chain as shown in FIG. 3 or FIG. 6, in which the material for the metal pieces 39 is supplied in the longitudinal direction of the chain in the form of a portion of a band 40; the welding operation, indicated by the arrow 41, takes place with the chain in the curved condition shown, with the curvature of the band 40 adapted to the curvature of the cradle pivot element. Once again, in terms of the metal piece 39, a curvature that is adapted to the outer contour of the cradle elements is attained, as well as a good bond. After the welding operation has been performed, the metal piece 39 is cut off along the line 42, 43.

Figure 8:
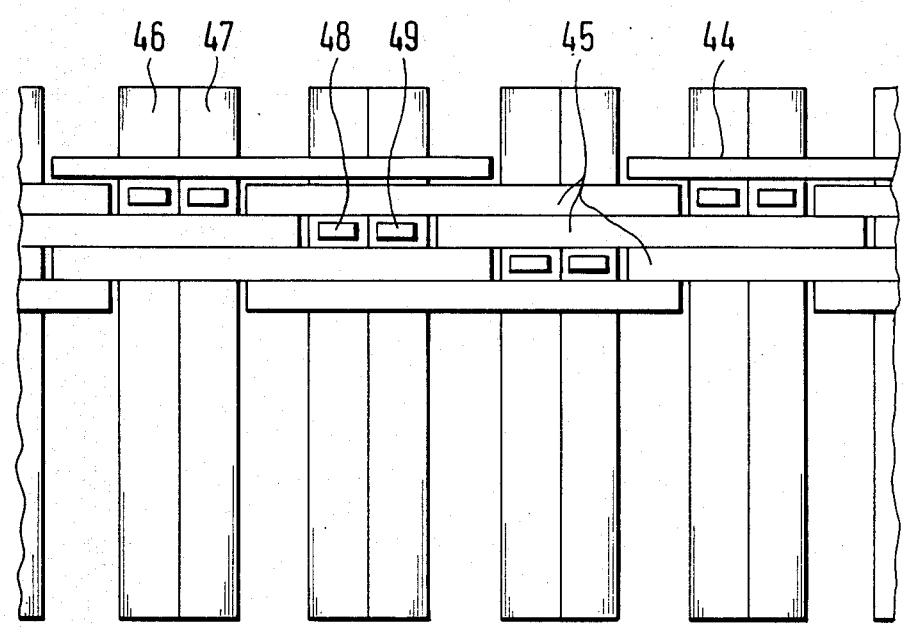
FIG. 8 shows a modified attachment of the link element securing means, in a chain having a three-plate-member structure.

Finally, FIG. 8 shows a plan view of a so-called three-plate-member chain having plates 44, 45 and link elements in the form of cradle pivot elements 46, 47. Because of the three-plate structure, the surfaces of the cradle pivot elements 46, 47 remain free at some points inside the plate packet, so that the metal pieces 48, 49 can be attached at those points; this placement of the metal pieces secures the cradle pivot elements in both directions from sliding sideways or falling out of the chain. Since the metal pieces are secured between plates only one metal piece is required for each cradle pivot element.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A plate-link chain for infinitely adjustable friction disks cone pulley drives, including hardened pivot link elements (2, 10, 11, 16, 17) joining individual chain links (1, 7, 19) by insertion of said hardened pivot link through recesses (4) therein in an assembled plate-link chain in which said pivot link elements have end faces (3) that transmit frictional forces between said friction disks cone pulley drives and said pivot link elements, said pivot link elements are inserted into recesses (4) in said chain links with the pivot link elements with at least one contacting part of their profile in pivot contact with said plate recesses and said hardened pivot link elements are secured within said recesses by at least one non-removable securing element against escaping sideways out of said plate recesses, said at least one non-removable securing element being a metal piece (5, 6, 12-15, 21-24, 37, 38, 39, 48, 49) secured in contour forming contact by means of energy beam welding with a portion of an outer surface of each of said pivot link elements with said securing elements secured to said pivot links outwardly of said chain links.

2. A plate-link chain as defined by claim 1 in which said pivot link element securing element means is secured along the outer end longitudinally of each of said pivot link elements.

3. A plate-link chain as defined by claim 1, in which one metal piece (5, 6, 12–15, 21–24, 37, 38, 39) is disposed on each end of each link pivot element (2, 10, 11, 16, 17), outside said chain links.

4. A plate-link chain as defined by claim 1, in which a metal piece in a chain having a three-plate-member structure, is disposed inside the confines of said chain links between opposing ends of two plates (45) having a mutual spacing between then crosswise to the direction of chain travel.

5. A plate-link chain as defined by claim 1, in which the pivot link elements in a respective cross-sectional plane have at least two metal pieces distributed over a portion of its circumference.

6. A plate-link chain as defined by claim 1 in which said pivot link element securing element for securing pairs of pivot link elements in the same recess is an open metal-band ring (30) mounted on the ends of the pairs of pivot link elements (16, 17) with their opening (29) pointing crosswise to the longitudinal direction of the chain, with portions of the ring joined to the pivot link elements at contacting parts thereof, with any non-joined portion of the ring cut through, thereby removing a portion of their circumference.

7. A plate-link chain as defined by claim 3, in which the pivot link elements in a respective cross-sectional plane have at least two metal pieces distributed over a portion of its circumference.

8. A plate-link chain as defined by claim 1 in which said securing element is fastened by laser welding.

9. A plate-link chain as defined in claim 3 in which said pivot link element securing element means is secured along the outer end longitudinaly of each of said pivot link elements.

10. A plate-link chain as defined by claim 3 in which said securing element is fastened by laser welding.

11. A plate-link chain as defined by claim 1 in which said metal pieces (25, 26) are secured to said pivot link element crosswise to the longitudinal direction of the chain.

12. A plate-link chain as defined by claim 3 in which said pivot link element securing element for securing pairs of pivot link elements in the same recess is an open metal-band ring (30) mounted on the ends of the pairs of pivot link elements (16, 17) with their opening (29) pointing crosswise to the longitudinal direction of the chain, with portions of the ring joined to the pivot link elements at contacting parts thereof, with any non-joined portion of the ring cut through, thereby removing a portion of their circumference.

13. A plate-link chain as defined by claim 3 in which said metal pieces (25, 26) are secured to said pivot link elements crosswise to the longitudinal direction of the chain.

* * * * *